Patented Nov. 7, 1944

2,362,018

UNITED STATES PATENT OFFICE 2,362,018

HEAT-HARDENABLE OIL-CONTAINING PHENOLIC RESINS

Arthur P. Mazzucchelli, Bloomfield, N. J., assignor to Bakelite Corporation, New York, N. Y., a corporation of New Jersey No Drawing. Application August 3, 1940,
Serial No. 351,217

9 Claims. (Cl. 260—19)

This invention relates to heat-hardenable resinous compositions useful as binders for fillers in preparing materials that are moldable in dry powder form by the action of heat and pressure into finished articles. More particularly it relates to such compositions that are oil-containing phenolic types of resins.

A fundamental problem associated with articles molded from phenolic resin compositions is that of brittleness. The inclusion of fibrous fillers such as wood flour has made it possible to mold articles of small or medium sizes sufficiently strong or tough to satisfy commercial requirements. But the problem has not been met satisfactorily with larger sized structures such as radio cabinets by this means and further modifications of the molding compositions have been required.

Then again the action of the material in the mold during a molding operation has offered serious objections. Molds largely used in the trade are open or flash molds; and molding materials for use in such molds must have a viscosity such that they are not forced or squeezed out by the plunger. On the other hand, the materials must have flow so that they are distributed with uniform density throughout the mold cavity and furthermore must retain the property of flow for a length of time to permit proper filling of all parts of the mold, and yet have a speed of cure or setting up that comes within a molding time cycle of about 90 to 120 seconds demanded by the molding industry for articles with walls of about one-eighth inch in thickness. Moreover molding materials have a tendency to stick to the mold surfaces and for that reason lubricants are included; but the usual quantities of lubricant normally required for good release creates a poor surface appearance in the molded articles.

The compositions of the present invention combine in one material a viscosity coupled with a long period of flow required for accurate molding of articles of uniform density and with those properties a speed of cure or heat-reactivity commercially required together with excellent release to yield molded articles of uniform density and good surface appearance. Moreover, the articles have improved mechanical strength, especially on impact and flexing, and in addition high arc resistance and other desirable electrical properties can be obtained. The compositions have for example been found most satisfactory, and markedly superior to other molding compositions in the properties indicated, for the molding of radio cabinets extending to sizes approximating one foot by two feet and approaching a foot in draft or depth with a wall thickness varying from three thirty-seconds to three-sixteenths of an inch.

In brief the properties of the molding compositions of this invention are dependent upon modified forms of resins obtained in the reaction of unsubstituted phenol with or without minor additions, not in excess of 20 per cent by weight based on the phenol of a cresol such as o-cresol. It has been found that such resins, though normally characterized by non-oil-solubility can be modified with drying oils having conjugated double bonds, or alternatively with drying or semi-drying fatty oils in a blown or oxidized condition and reacted at a temperature not exceeding 175° C. as hereinafter described and at the same time given a heat-reactivity or speed of cure as previously indicated.

The invention is more fully set forth in the examples which follow. The proportions are by weight unless otherwise stated.

*Example 1.*—50 parts of phenol containing 10% of ortho cresol were reacted with 35 parts of 37% aqueous formaldehyde and 0.5 part of phosphoric acid by refluxing at atmospheric pressure for about 7 hours; other acid catalysts can be substituted for phosphoric, such as oxalic or phenol sulfonic. The mass was dehydrated by heating to 160° C. To the reaction mass there was then added 23.5 parts of blown soya bean oil and the reaction continued with agitation at 160°–175° C. for about 9.5 hours or until a clear bead was obtained. A vacuum of 26 inches was applied, and the mass was bodied by heating for about an hour or so or until a brittle resin of the desired melting point was obtained. An analysis showed that practically all of the formaldehyde was reacted into the mass, and furthermore no phenol was recoverable in the distillate; the latter is indicative of a combination in some manner of the unreacted phenol with the oil. The product had an oil content of somewhat over 30% and a melting point of about 85° C.; it was grindable and non-sintering.

*Example 2.*—A modified form of the product was obtained by using unsubstituted phenol in place of a mixture of phenol and ortho cresol in substantially the same proportions and with the same operating conditions. This gave a product with a melting point of about 68° C.

*Example 3.*—In another modification of Example 1 having an oil content of 20%, 34 parts of phenol with 10% ortho cresol was reacted with 24 parts of 37% formaldehyde in the presence of 1% of phosphoric acid based on the phenol by refluxing for 6 hours and then dehydrating at atmospheric pressure to 150° C. About 8.9 parts of blown soya bean oil were slowly added, and the mixture was heated with agitation to 160° C. and bodied for about 6.5 hours or until a clear bead was obtained. A vacuum of 27 inches was applied and the bodying continued for 6.5 hours longer or until the mass when cold had a melting point of about 93° C.

In the manufacture of resins by the process of these examples other blown drying oils can be substituted; blown oils are drying or semi-drying oils, such as linseed, Perilla, soya bean, fish and cotton seed, and oxidized, for example, by passing a current of air at a temperature of about 150° C. through a body of oil to give viscosities ranging from 1500 k. v. to 12,500 k. v. A reason for the preference for blown oils is that they are inherently more soluble in the phenolic resins than the raw oils; but more significant is the fact that the reaction can be carried out at low temperatures, at 175° C. or below, which permits the use of ordinary jacketed stills designed for low pressure-steam heating, i. e., pressures of no more than 140 lbs. and thereby oil or fire heating or expensive equipment requiring high boiling heating media is obviated; low temperature reactions including dehydrations of the resins are furthermore highly important because all the free phenol and the low boiling resin intermediates formed are caused to react and remain in the resin mass and the oil-containing mass has less tendency to gel or become rubbery. It has also been found that the more unsaturated drying oils having conjugated double bonds, such as tung and oiticica, are amenable to the process of these examples in the raw condition without blowing, and these oils or blown oils can be included in any desired amount and at one time, the proportion being limited only by the properties desired in the final product. In general for use in making molding materials it is preferred to limit the oil content to from 10 to 60% of the oil-modified resin composition; below 50% oil content the resins are grindable and may be made into molding material by the usual process of blending with fillers in a ball mill and compounding on rolls, but above that amount the compounding of molding materials necessitate the use of a kneader or Banbury mixer.

The incorporation of any of the foregoing resins as a binder in molding material imparts a number of improvements which distinguish them from molding materials heretofore commercially available. Among these may be mentioned:

(A) Their lubricating properties,
(B) Their non-penetrative characteristics,
(C) A degree of flexibility when cured with the hardening agent,
(D) An increased mechanical strength,
(E) Improved electrical properties.

(A) The lubricating properties of the oil-modified resins as binders in molding materials were found to give unusually good preforming characterics and also excellent release and non-sticking qualities. The property of release can be obtained by including in non-oil-modified resins from 1.5 to 3% of lubricants such as commercial stearic acid, zinc stearate, etc.; but this results in a loss of preforming properties and good surface appearance in the molded articles, since the excess lubricant results in preforms which disintegrate readily and the molded articles are ruined by streaks and blotches of lubricant coming to the surface; a decrease in the amount of lubricant, however, interferes with preforming on account of cracking on ejection from a preforming machine. The resins of this invention do not preclude the use of small amounts of lubricant, and in fact small quantities, i. e., about 0.5% of stearic acid in the molding material, are found beneficial. This is demonstrated by the following comparative tests.

A comparative phenol resin of the prior art is one made from 100 parts of phenol containing 10% of ortho cresol and 72 parts of 37% formaldehyde reacted in the presence of 1 part of oxalic acid. Molding materials were made from this resin, from the resin of example 1 and from varying mixtures of the two resins; in each case about 41.5 parts of resin were compounded with 4.3 parts of hexa, 1.5 parts of stearic acid, 3.2 parts of lime, and 44.5 parts of wood flour together with small amounts of pigmenting material. The materials without the wood flour were first ball milled for 1.5 hours, wood flour was added and the mixture milled for an additional hour: the powder was then subjected to rolling at about 105° C.–120° C. for 2–5 minutes or until it had a flow at 500 lbs. pressure of 0.8–1.2 inches as indicated by a Bakelite flow tester. Thereupon the molding materials were granulated and subjected to a sticking test. The force in pounds required to release at the first molding with material made from the non-oil-modified resin was from 8.5–9.5; that required to release the material made with the resin of Example 1 was 0.5 lb. at the first molding and from 1 to 1.5 lbs. at the tenth molding; a molding material with a fifty-fifty mixture of the resins requires 2.5–3.5 lbs. to release at the first molding and from 3.5–4.5 lbs. for the tenth molding.

That a small amount of stearic acid, for example, is desirable in the molding materials is shown by the sticking test applied to a molding material made as above with the oil-modified resin but with percentages of stearic acid ranging from zero to 1.5. Without any stearic acid the force in pounds required to release varied from 0.5 to 3.5 with successive moldings; with 0.5% the force remained constant at 0.5 lb.; with 1% the force varied from 0.5 and 1.5 lbs.; and with 1.5% it varied from about 1 to 4 lbs. This series of tests indicated the optimum results with not more than 0.5% of lubricant. This figure, however, depends largely on the lubricating characteristics of the oil with which the resin is modified.

(B) The non-penetrative characteristics of the oil-modified resins of this invention contribute to the desirable properties of the molding materials made from them. To the non-penetrativeness may be attributed the relatively long flow of the molding material which enables it to more easily fill out intricate molds when subjected to reduced pressures; it further permits the preparation of molding material with relatively low resin content, and since the resin forms the principal cost of the molding material this means a substantial savings. To demonstrate these effects comparative molding materials were prepared; in one 25 per cent of the typical non-oil-modified resin previously described was used and in the other the same amount of the oil-modified resin of Example 1 was incorporated. In each case they were mixed with 4.5 parts of hexamethylenetetramine, 3.2 parts of lime, 1.5 parts of stearic acid together with small amounts of pigment; and after ball milling 45.8 parts of wood flour and 15 parts of asbestos floats were milled into the mixture and the mixture hot rolled and ground. The two compositions were then tested in a flow tester with the following results:

| Pressure | Flow | |
|---|---|---|
| | 1-non-oil modified resin | 2-oil-modified resin |
| | Inches | Inches |
| 500 lbs | 0 | 0.26 |
| 700 lbs | 0 | 0.54 |
| 1,000 lbs | 0.18 | 1.25 |
| 1,500 lbs | 0.55 | |
| 2,000 lbs | 1.20 | |

In the cup flow test it was found the first mixture required 21.5 seconds to fill the mold, while the oil-modified resin molding material filled the cup mold in 8.5 seconds. Likewise, the preforming characteristics were much better in the oil-modified composition; the percent variation in mass from the average in the first was from +9.5 per cent to −18.5 per cent and from +2.4 per cent to −2.6 per cent in the oil-modified composition. Also the per cent variations in density from the average were in the first from +8.8 per cent to −15.0 per cent and only +1.9 per cent to −2.2 per cent in the oil-modified resin molding composition.

With molding materials of higher resin content these properties permit longer rolling and therefore a better and more intimate resin distribution in the material as well as a more uniform distribution of dyes and pigments. This was shown to be true in colored molding materials where the molded articles were free from segregation and variation in tone.

(C) The increased degree of flexibility is demonstrated by the molding materials made with the oil-modified resins of the present invention in the molding of threaded closures of caps or similar articles having molded projections which require a temporary deformation of the molded articles upon stripping. It is also demonstrated by the resisting to cracking when molded around inserts. The latter was shown by molding a jacket about 0.1 inch thick around a hexagonal steel rod two inches in length and about one inch in diameter; such molded jackets from the usual non-oil-modified molding material usually crack when the metal inserts cool to room temperature but the oil-modified resin materials were found to be intact on cooling, and in many cases could be subjected to repeated rapid changes in temperature from 120° C. to −15° C.

(D) The increased mechanical strength obtained is evidenced by a comparison with a standard wood flour molding material generally considered to be excellent in this respect. It is shown in the following table:

| | Standard M. M. | 30% oil modified resin |
|---|---|---|
| Tensile strength lbs./sq. in | 8,000–8,500 | 7,833 |
| Impact strength lbs./sq. in | 2.00 | 3.12 |
| Flexural strength lbs./sq. in | 10,000 | 13,580 |
| Modulus of elasticity | $0.96 \times 10^6$ | $0.799 \times 10^6$ |

The improvement in impact strength is particularly noticeable when cotton waste is substituted as a filler for wood flour. A composition of this character was made for example, by taking a 50 per cent solution of the resin of Example 1 in acetone or alcohol and mixing 100 parts of the varnish so made with 45 parts of cotton waste and including hexamethylenetetramine and other ingredients as before; the mixture was blended in a kneader and dried in the vacuum oven until the desired viscosity was obtained. A molding material thus made with one of similar composition but with the standard resin gave on test the following results:

| | Standard M. M. | Oil-modified resin |
|---|---|---|
| Per cent oil in resin | None | 30 |
| Impact strength ft. lbs./in. sq | 46.5 | 76.2 |
| Tensile strength lbs./sq. in | 7,240 | 5,377 |
| Flexural strength lbs./sq. in | 5,826 | 12,060 |
| Modulus of elasticity $\times 10^6$ | 1.09 | 1.03 |

(E) The improvement in electrical properties by the inclusion of the oil is most marked and increases with an increase in oil content. For instance, a material which has shown satisfactory arc resistance is one that was made from a resin containing approximately 43% of oil as set out in the following example.

*Example 4.*—100 parts of phenol were reacted with 63.5 parts of 37% formaldehyde in the presence of one part of phosphoric acid by refluxing for 6 hours at atmospheric pressure and agitation until substantially all the formaldehyde was combined. It was dehydrated by heating to 160° C. at atmospheric pressure. Thereupon there was added very slowly to avoid foaming about 73 parts of blown soya bean oil. The mixture was reacted with vigorous agitation at 160°–175° C. until a clear bead was obtained. An additional 1% of phosphoric acid based on the total mixture was dissolved into the mass with about 100 parts of acetone. A 29 inch vacuum was applied to remove volatile solvent and other volatile materials. The resin was then bodied by heating until it reached the stage of brittleness when cool whereupon it was discharged into pans. The melting point of the product was about 83° C.

In the foregoing example it is to be noted that approximately 1% of phosphoric acid was added to the resin-oil composition after it had cleared. It has been found that this addition, which is of application to the other examples as well, improves the grindability and increases the speed of curing of the molding material particularly when made with a resin having 40% or more of oil included. The amount added can be varied from about 0.25 to 1.0% and other mineral acids can be substituted.

The preferred oil content for arc-resistant materials is above 40% and generally within the range of 40–50%. This range is preferred as a grindable product results, and this enables the molding material to be made by the standard dry process. If the varnish method of impregnation of filler is used, the oil content can be increased to 50–60%.

For making a molding material for arc resistant purposes about 49 parts of the above oil-modified resin were mixed with 4.9 parts of hexamethylenetetramine, 0.5 part of stearic acid, 1.5 parts of pigment, 1.0 part of arsenic trioxide.

After ball milling this mixture was milled with 43.1 parts of wood flour, rolled and ground.

The inclusion of arsenic trioxide in the above composition is as a substitute for lime to prevent staining of the molds. Lime is undesirable as it makes the arc resistance erratic. Furthermore the substitute material does not neutralize the acidity of the resin by which increased speed of curing is obtained in the molding material. With the foregoing molding composition molded articles have been obtained with an arc resistance of 120–150 seconds as determined by A. S. T. M. specifications. That it is the resin which contributes the property of arc resistance is demonstrated by the fact that by omitting the filler and merely reacting the resin with 10–15% of hexa the same arc resistance values were obtained.

Referring to the present disclosure in general the outstanding features associated with the present invention are the speed of cure of the molding material and the good appearance of the molded articles in spite of the high oil content. This leads to the belief that the oil-modified resin is not a mixture but a combination caused by a reaction of the oil and the resin.

Not only are the oil-modified resins of this invention useful in the preparation of molding compositions but they can also be used as plasticizers for other resins and molding compositions. Small amounts are generally sufficient for this purpose.

What is claimed is:

1. An oil-containing composition, reactive with a hardening agent to form a heat-hardening binder in a dry-process molding material, comprising a resin, prepared by an acid-catalyzed reaction of formaldehyde with an excess over equimolecular proportions of phenol that contains from zero to 20 per cent of its weight of a cresol, and reacted at a temperature not in excess of 175° C., to retain as reactants in the resin the free phenol and intermediates boiling above that temperature, with an amount of oil constituting from 10 to 60 per cent of the resin and oil composition, said oil being selected from the group consisting of fatty drying oils having conjugated double bonds and blown fatty drying and semi-drying oils.

2. An oil-containing composition, reactive with a hardening agent to form a heat-hardening binder in a dry-process molding material, comprising a resin, prepared by an acid-catalyzed reaction of formaldehyde with an excess over equimolecular proportions of phenol that contains from zero to 20 per cent of its weight of a cresol, and reacted at a temperature not in excess of 175° C., to retain as reactants in the resin the free phenol and intermediates boiling above that temperature, with an amount of oil constituting from 10 to 60 per cent of the resin and oil composition, said oil being selected from the group consisting of fatty drying oils having conjugated double bonds and blown fatty drying and semi-drying oils, said composition having added thereto from about 0.25 to 1.0 per cent of a mineral acid.

3. An oil-containing composition, reactive with a hardening agent to form a heat-hardening binder in a dry-process molding material, comprising a resin, prepared by an acid-catalyzed reaction of formaldehyde with an excess over equimolecular proportions of phenol that contains from zero to 20 per cent of its weight of a cresol, and reacted at a temperature not in excess of 175° C., to retain as reactants in the resin the free phenol and intermediates boiling above that temperature, with an amount of oil constituting from 10 to 60 per cent of the resin and oil composition, said oil being selected from the group consisting of fatty drying oils having conjugated double bonds and blown fatty drying and semi-drying oils, said composition having added thereto from about 0.25 to 1.0 per cent of phosphoric acid.

4. Process of preparing an oil-containing composition, suitable in conjunction with a hardening agent to act as a binder in a dry-process molding material, which comprises reacting from about 0.575 to 0.81 mol of formaldehyde with a mol of phenol which contains from zero to 20 per cent of a cresol in the presence of an acid catalyst, dehydrating at a temperature not exceeding 160° C. at atmospheric pressure, and reacting the resin with an oil selected from the group consisting of fatty drying oils having conjugated double bonds and blown fatty drying and semi-drying oils in amount to constitute from 10 to 60 per cent of the resin and oil composition at a temperature not exceeding 175° C. to retain as reactants the free phenol and intermediates present in the resin.

5. Process of preparing an oil-containing composition, suitable in conjunction with a hardening agent to act as a binder in a dry-process molding material, which comprises reacting from about 0.575 to 0.81 mol of formaldehyde with a mol of phenol which contains from zero to 20 per cent of a cresol in the presence of an acid catalyst, and reacting the resin with an oil selected from the group consisting of fatty drying oils having conjugated double bonds and blown fatty drying and semi-drying oils in amount to constitute from 10 to 60 per cent of the resin and oil composition at a temperature not exceeding 175° C. to retain as reactants the free phenol and intermediates present in the resin.

6. Process of preparing an oil-containing composition, suitable in conjunction with a hardening agent to act as a binder in a dry-process molding material, which comprises reacting from about 0.575 to 0.81 mol of formaldehyde with a mol of phenol which contains from zero to 20 per cent of a cresol in the presence of an acid catalyst, reacting the resin with an oil selected from the group consisting of fatty drying oils having conjugated double bonds and blown fatty drying and semi-drying oils in amount to constitute from 10 to 60 per cent of the resin and oil composition at a temperature not exceeding 175° C. to retain as reactants the free phenol and intermediates present in the resin, and adding to the composition from about 0.25 to 1.0 per cent of a mineral acid.

7. Process of preparing an oil-containing composition, suitable in conjunction with a hardening agent to act as a binder in a dry-process molding material, which comprises reacting from about 0.575 to 0.81 mol of formaldehyde with a mol of phenol which contains from zero to 20 per cent of a cresol in the presence of an acid catalyst, reacting the resin with an oil selected from the group consisting of fatty drying oils having conjugated double bonds and blown fatty drying and semi-drying oils in amount to constitute from 10 to 60 per cent of the resin and oil composition at a temperature not exceeding 175° C. to retain as reactants the free phenol and intermediates present in the resin, and adding to the composition from about 0.25 to 1.0 per cent of phosphoric acid.

8. The product of claim 1 in admixture, as a plasticizer, with a non-oil-containing heat-hardenable phenolic-aldehyde resin and a hardening agent to form a heat-hardening binder in a dry-process molding material.

9. The product of claim 2 in admixture, as a plasticizer, with a non-oil-containing heat-hardenable phenolic-aldehyde resin and a hardening agent to form a heat-hardening binder in a dry-process molding material.

ARTHUR P. MAZZUCCHELLI.